United States Patent
Arafat et al.

(10) Patent No.: US 12,388,381 B2
(45) Date of Patent: Aug. 12, 2025

(54) SYMMETRICAL COMPONENTS DOMAIN CONTROL IN A MULTIPHASE MACHINE SYSTEM

(71) Applicant: Cummins Inc., Columbus, IN (US)

(72) Inventors: Akm Arafat, Blaine, MN (US); Oliver Daniel Wilson, Fridley, MN (US)

(73) Assignee: Cummins Inc., Columbus, IN (US)

( * ) Notice: Subject to any disclaimer, the term of this patent is extended or adjusted under 35 U.S.C. 154(b) by 67 days.

(21) Appl. No.: 18/274,567

(22) PCT Filed: Jan. 14, 2022

(86) PCT No.: PCT/US2022/012410
§ 371 (c)(1),
(2) Date: Jul. 27, 2023

(87) PCT Pub. No.: WO2022/169575
PCT Pub. Date: Aug. 11, 2022

(65) Prior Publication Data
US 2024/0113645 A1  Apr. 4, 2024

Related U.S. Application Data

(60) Provisional application No. 63/146,147, filed on Feb. 5, 2021.

(51) Int. Cl.
*H02P 21/05* (2006.01)
(52) U.S. Cl.
CPC .................................. *H02P 21/05* (2013.01)
(58) Field of Classification Search
CPC ........... H02P 21/05; H02P 21/14; H02P 21/22
(Continued)

(56) References Cited

U.S. PATENT DOCUMENTS 8,054,032 B2 * 11/2011 Chakrabarti ............ B60L 58/20
363/133
9,341,660 B2    5/2016 Wu et al.
(Continued)

FOREIGN PATENT DOCUMENTS

CN            109660144 A    4/2019

OTHER PUBLICATIONS

International Preliminary Report on Patentability received for PCT Patent Application No. PCT/US2022/012410, mailed on Aug. 17, 2023, 10 pages.
(Continued)

*Primary Examiner* — David Luo
(74) *Attorney, Agent, or Firm* — Faegre Drinker Biddle & Reath LLP

(57) ABSTRACT

A multiphase motor control system and method of operation. Discloses embodiments comprise receiving multiphase reference commands, transforming the multiphase reference commands into corresponding reference symmetrical components, receiving feedback information representative of multiphase drive signals in a motor, transforming the feedback information into corresponding feedback symmetrical components, generating multiphase motor control symmetrical components based on the reference symmetrical components and the feedback symmetrical components, and transforming the multiphase motor control symmetrical components into corresponding multiphase motor drive control signals.

17 Claims, 9 Drawing Sheets

(58) Field of Classification Search
USPC .............................. 318/400.02, 400.01, 700
See application file for complete search history.

(56) References Cited

U.S. PATENT DOCUMENTS

| | | | |
|---|---|---|---|
| 10,333,445 B2* | 6/2019 | Pramod | ................... H02P 21/05 |
| 10,784,806 B2* | 9/2020 | Omata | ................... H02P 21/50 |
| 11,916,504 B2* | 2/2024 | Ling | ....................... B60L 53/22 |
| 2010/0259207 A1 | 10/2010 | Kitanaka | |
| 2011/0012544 A1 | 1/2011 | Schulz | |
| 2011/0040519 A1 | 2/2011 | Yeh | |
| 2013/0043816 A1 | 2/2013 | Welchko | |
| 2019/0006973 A1 | 1/2019 | Zhou et al. | |
| 2021/0028611 A1 | 1/2021 | Brusilowicz | |

OTHER PUBLICATIONS

International Search Report and Written Opinion for International patent application No. PCT/US2022/012410, filed Jan. 14, 2022, mailed Apr. 11, 2022.

* cited by examiner

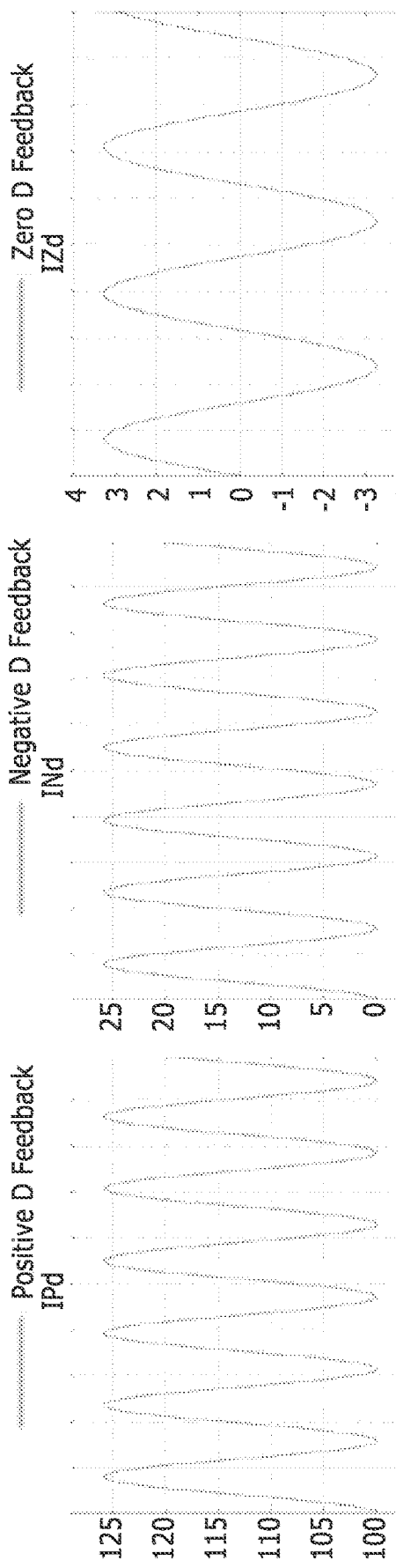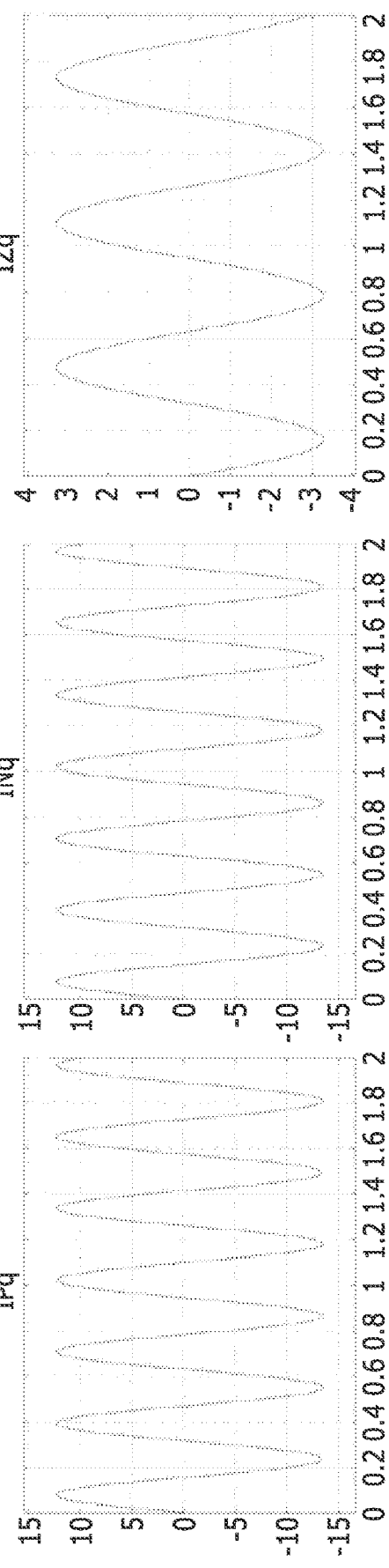

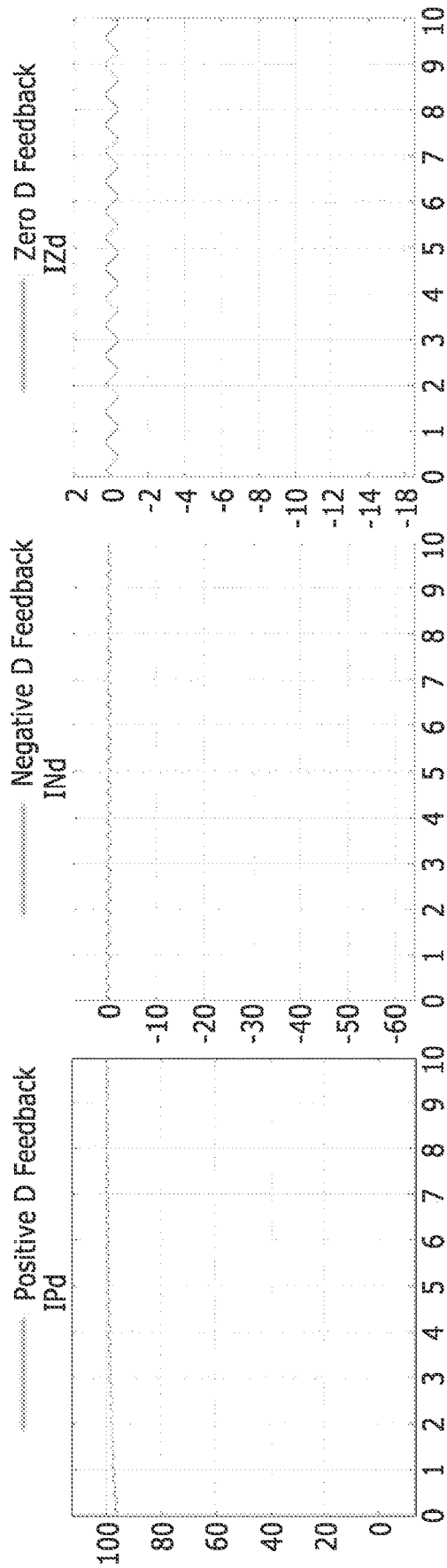
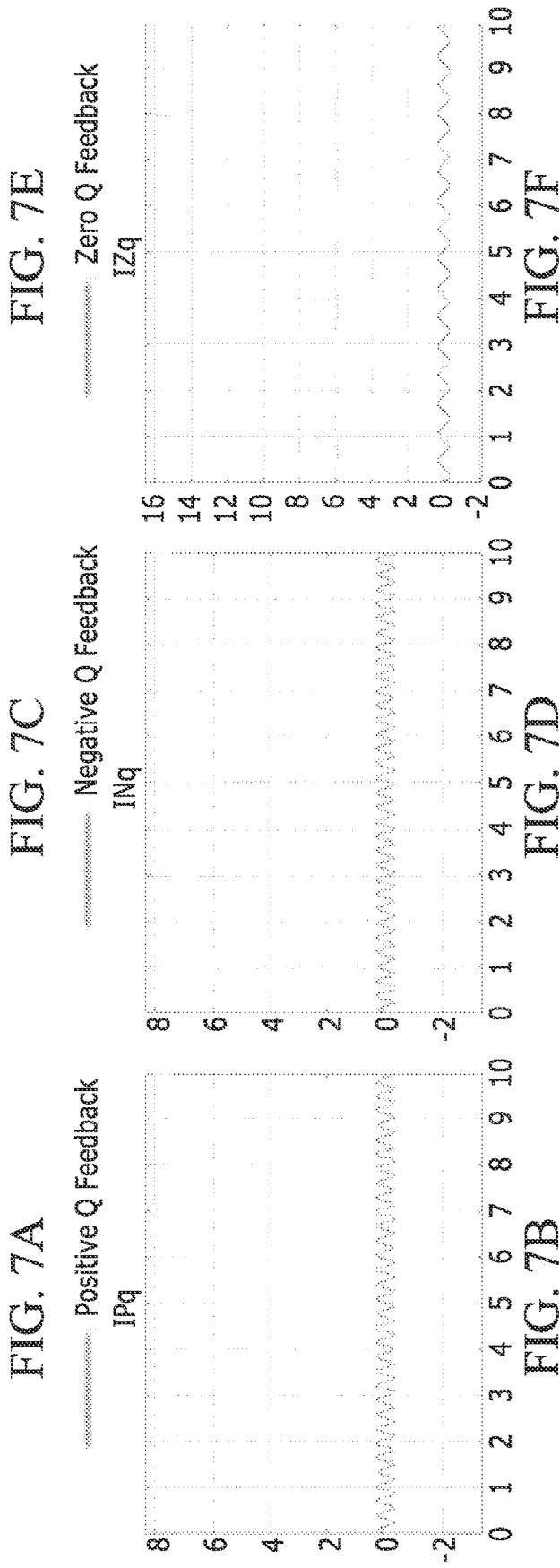
FIG. 7A — Positive D Feedback IPd
FIG. 7B — Positive Q Feedback IPq
FIG. 7C — Negative D Feedback INd
FIG. 7D — Negative Q Feedback INq
FIG. 7E — Zero D Feedback IZd
FIG. 7F — Zero Q Feedback IZq

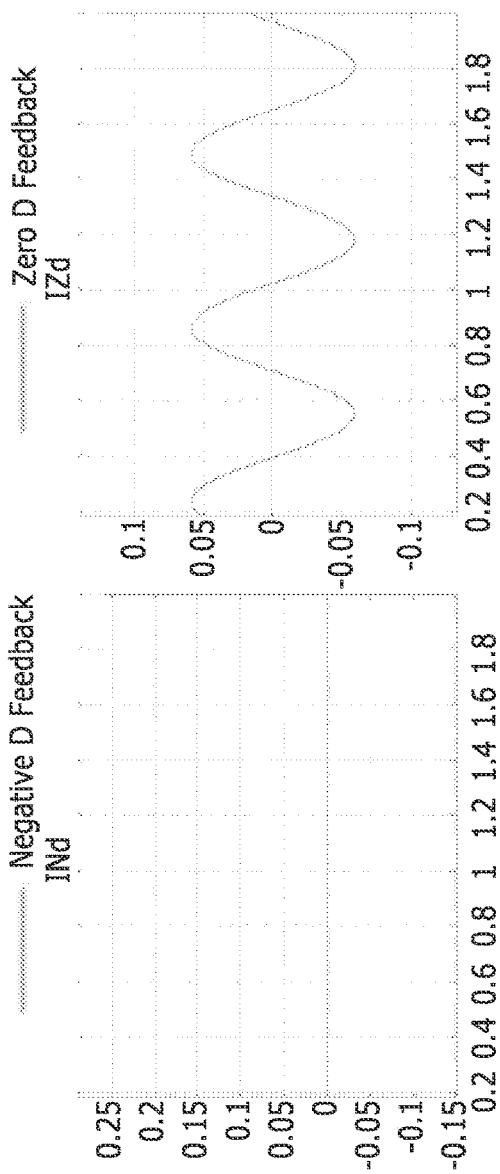
FIG. 9A
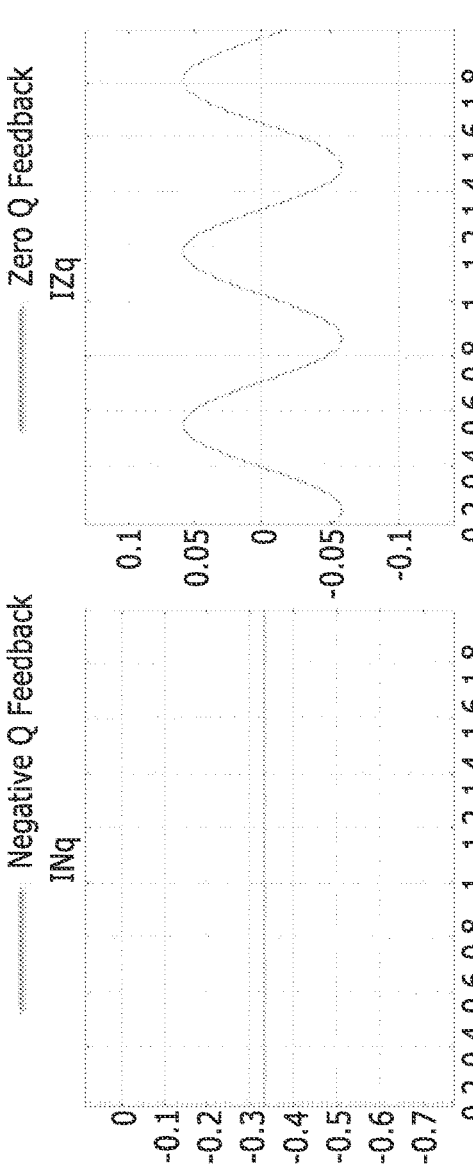
FIG. 9E
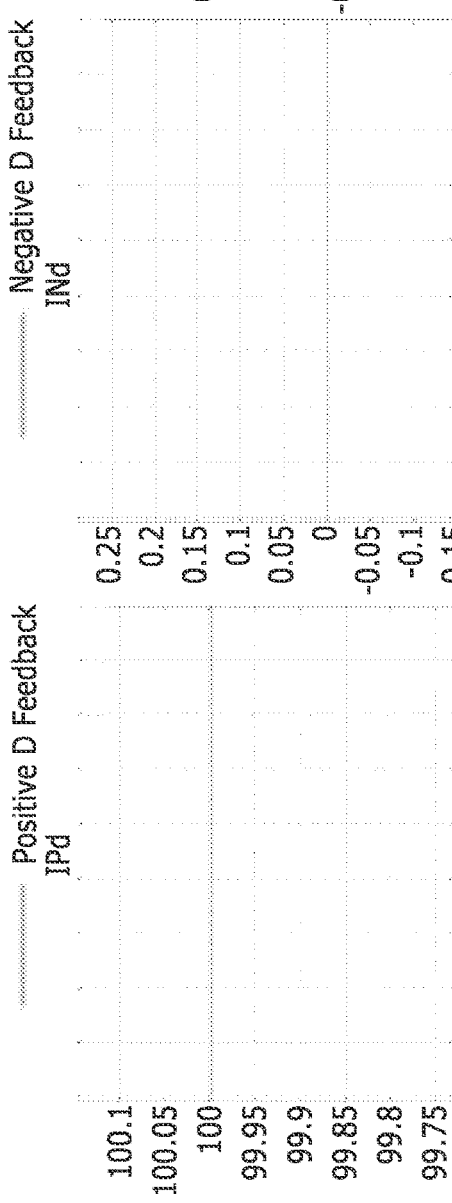
FIG. 9B
FIG. 9C
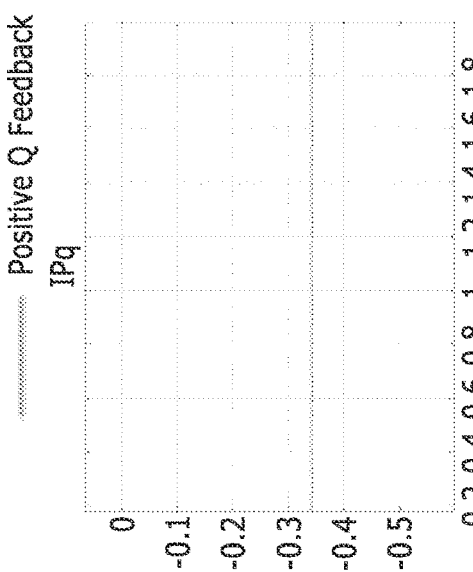
FIG. 9D
FIG. 9F

SYMMETRICAL COMPONENTS DOMAIN CONTROL IN A MULTIPHASE MACHINE SYSTEM

CROSS-REFERENCE TO RELATED APPLICATIONS

The present application claims the benefit of priority to International Patent Application No. PCT/US2022/012410, filed Jan. 14, 2022, which claims the benefit of priority to U.S. Provisional Patent Application No. 63/146,147, filed Feb. 5, 2021, the contents of which are incorporated herein by reference in their entirety.

FIELD

This disclosure relates generally to multiphase machine control systems. Disclosed embodiments include a control method operating in a symmetrical components domain.

BACKGROUND

Multiphase alternating current (AC) machines such as motor systems are used in a wide variety of applications including industrial settings and motor vehicles. Motor systems of these types include an AC motor and/or generator, inverter, and control system. In response to a reference or input command, the control system causes the inverter to apply power from an energy source to the motor in a controlled manner, and causes the motor to provide the commanded output. For example, in response to a torque command, the motor control system will cause the motor to deliver the requested torque at the motor output shaft.

These machines and associated systems may be characterized by certain imbalances during their operation. For example, impedance or other electrical imbalances may be present due to manufacturing variances, mutual coupling and transient operating conditions of the machines. Imbalances such as these may detrimentally constrain operating characteristics such as total output and efficiency of the machines. Known approaches to compensate for imbalances of these types include considering and averaging the imbalances on a system level. These approaches may cause undesired oscillations and instabilities, and may limit the effectiveness and response capabilities of the control system. Moreover, at any instant in time that the machine is operating near its specified performance limit, fewer than all of the machine's phases may be operating near those performance limits. The poor performing phases may limit the performance of the overall system in these situations.

There remains, therefor, a continuing need for improved multiphase machine control systems. In particular, there is a need for control systems capable of minimizing or reducing electrical leading to electromagnetic imbalances. Systems that can minimize or reduce imbalances between the multiple phases of the machines would be particularly desirable.

SUMMARY

Disclosed embodiments include a multiphase machine control system including symmetrical components domain control processing. In embodiments, symmetrical components transforms are followed by dq0 (direct-quadrature-zero) reference frame transforms for the individual symmetrical components. The transforms are performed on potentially unbalanced input reference command and system feedback signal sets. The dq0 sets are compared to generate symmetrical components dq0 error sets, which may then be summed and used as the error for driving the multiphase system.

One example is a method for operating one or more processors of a multiphase machine (e.g., motor) control system. Embodiments of the method comprise: receiving multiphase reference commands; transforming the multiphase reference commands into corresponding reference symmetrical components; receiving feedback signals representative of multiphase drive signals in a machine; transforming the feedback signals into corresponding feedback symmetrical components; generating multiphase motor control symmetrical components based on the reference symmetrical components and the feedback symmetrical components; and transforming the multiphase motor control symmetrical components into corresponding multiphase motor drive control signals.

In embodiments, the method further comprises: transforming the reference symmetrical components from a stationary reference frame to a synchronous reference frame; and transforming the feedback symmetrical components from the stationary reference frame to the synchronous reference frame. In these embodiments, generating the multiphase motor control symmetrical components may include generating the multiphase motor control symmetrical components based on the reference symmetrical components in the synchronous reference frame and the feedback symmetrical components in the synchronous reference frame. Transforming the multiphase motor control symmetrical components into the multiphase motor drive control signals may comprise transforming the multiphase motor control symmetrical components in the synchronous reference frame into multiphase motor control symmetrical components in the stationary reference frame.

In any or all of the above embodiments, transforming the reference symmetrical components and the feedback symmetrical components from the stationary reference frame to the synchronous reference frame, and transforming the multiphase motor control symmetrical components in the synchronous reference frame into the stationary reference frame, may comprise direct-quadrature-zero transformations.

Any or all of the above embodiments may further include phase transforming, such as alpha-beta transforming (e.g., using αβγ transforms), the stationary reference frame reference symmetrical components, the stationary reference frame feedback symmetrical components, and the synchronous reference frame motor control symmetrical components.

In any or all of the above embodiments, generating multiphase motor control symmetrical components may comprise summing the reference symmetrical components and the feedback symmetrical components. For example, summing the reference symmetrical components and the feedback symmetrical components may comprise subtracting the feedback symmetrical components from the reference symmetrical components.

In any or all of the above embodiments, generating the multiphase motor control symmetrical components may comprise proportionally integrating the multiphase motor control symmetrical components by a motor control algorithm.

Examples include a motor control system including one or more processors configured to perform the method of any or all of the above embodiments.

Examples include a motor system comprising a motor, an inverter, and the motor control system in accordance with any or all embodiments of the above example.

Examples include a non-transitory data storage medium programmed with instructions to perform the method of any or all of the above embodiments.

BRIEF DESCRIPTION OF THE DRAWINGS

FIGS. 5A-5F are graphs of control parameters of an exemplary motor system operating in the open loop form corresponding to FIG. 4, in accordance with embodiments.

FIGS. 7A-7F are graphs of control parameters of an exemplary motor system operating in the closed loop form corresponding to FIG. 6, in accordance with embodiments.

FIGS. 9A-9F are graphs of control parameters of an exemplary motor system operating in the open loop form corresponding to FIG. 8, in accordance with embodiments.

DETAILED DESCRIPTION

Figure 1:
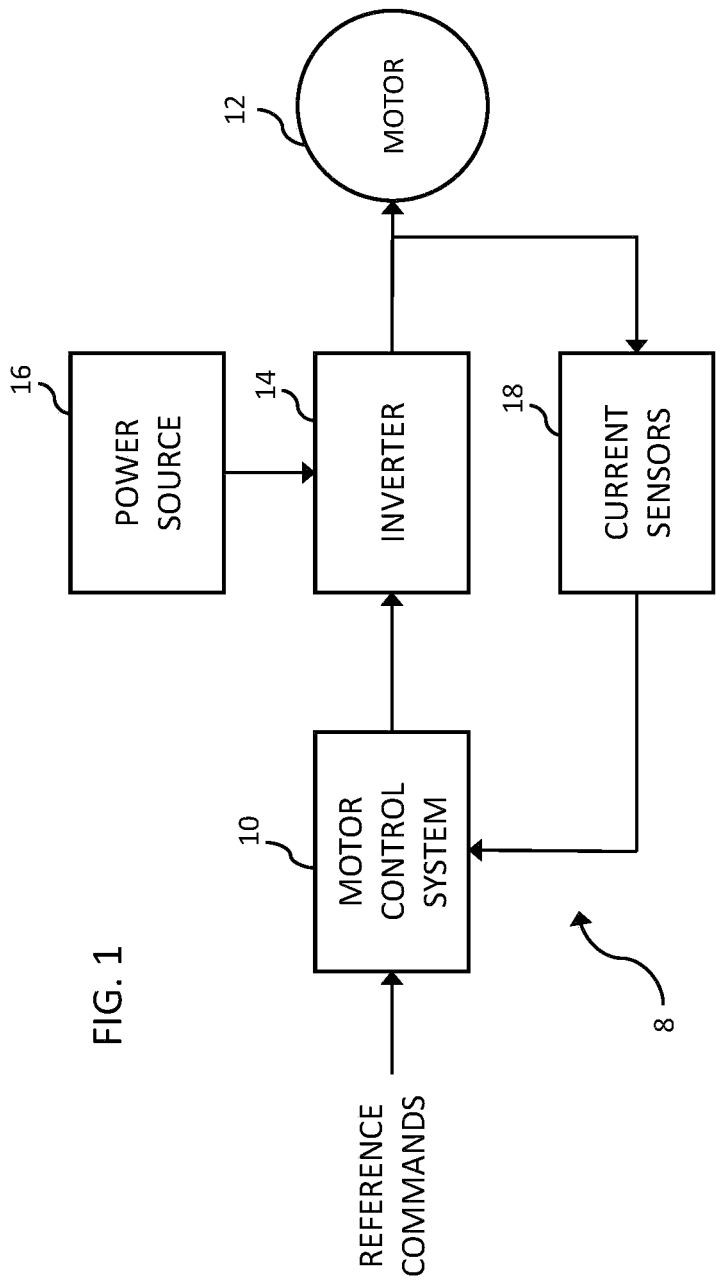
FIG. 1 is a diagrammatic illustration of a multiphase machine system, in accordance with embodiments.

FIG. 1 is a diagrammatic illustration of a motor system 8 including a motor control system 10 and multiphase alternating current (AC) machine such as motor 12 in accordance with embodiments. Outputs of the motor control system 10 are coupled to an inverter 14. Inverter 14 is responsive to the outputs of the motor control system 10, and controls the application of power from a source 16 to the motor 12. In addition to input multiphase control or reference commands such as a torque request, motor control system 10 receives feedback inputs from components of the system 8. In the illustrated embodiments, for example, motor control system 10 is coupled to receive feedback inputs representative of electrical operating characteristics of the motor 12 provided by devices such as current sensors 18.

As described in greater detail below, motor control system 10 processes the reference commands and feedback signals using control algorithms, including processing in a symmetrical components domain, to generate multiphase motor drive control signals or commands that cause the motor 12 to provide the commanded outputs. By this control approach including the symmetrical components domain operation, the control system 10 may command imbalances to the output of the inverter 14 that compensate for imbalances in the electrical characteristics of the motor 12 and/or create imbalances that may enhance the performance of the motor (e.g., if one or more phases is near or at a limit). The control method may also provide for reduction or addition of system harmonics in the time domain by acting on the instantaneous unbalanced measurements of the system 8. For example, harmonic content may be pre-calculated into one or more of the reference commands, thereby causing the motor 12 to be driven in a manner that produces those harmonics.

In embodiments, motor 12 is a multiphase AC electric machine having a rotor and stator windings. For example, motor 12 may be an interior permanent magnet (IPM) motor, an induction motor, or a synchronous motor. Although exemplary embodiments are described below in connection with a six-phase motor 12, embodiments also include fewer (e.g., three-) or more (e.g., nine-) phase machines. Power source 16 can include a battery, fuel cell, conventional power grid or any other energy source suitable for the motor 12 and its application, and is a direct current (DC) source in embodiments.

Motor 12 operates in response to voltage drive signals or commands applied by the inverter 14. In embodiments such as those described below comprising a six-phase motor 12, inverter 14 provides voltage drive commands $V_A$, $V_B$, $V_C$, $V_D$, $V_E$, $V_F$ (i.e., $V_{A-F}$) to the motor 12. The voltage drive commands may be pulse-width modulated (PWM) signals. The applied voltages create torque-producing currents in the windings of the motor 12 that result in rotation of the motor shaft. Inverter 14 can be of any known or otherwise conventional design. Such inverters 14 commonly include a plurality of power switches to provide the PWM drive signals.

Each of the voltage drive commands $V_{A-F}$ corresponds to and is associated with one of the phase windings (e.g., which may be designated A-F) of the motor 12. Accordingly, the six-phase motor 12 embodiments described herein have six voltage drive commands $V_{A-F}$. In embodiments, the six-phase motor 12 may be configured to include two sets of three-phase windings (e.g., a first set of windings and a second set of windings). For purposes of convention and example, three of the voltage drive commands such as $V_{A-C}$ may be associated with and applied to the three windings of the first set of windings (e.g., windings A-C), and three of the voltage drive commands such as $V_{D-F}$ may be applied to the three windings of the second set of windings (e.g., windings D-F).

Current sensors 18 are coupled to the motor 12 and provide signals representative of the current (I) on each of the windings of the motor. In embodiments such as those described below comprising a six-phase motor 12, current sensors 18 provide feedback signals $I_A$, $I_B$, $I_C$, $I_D$, $I_E$, $I_F$ (i.e., $I_{A-F}$) representative of the instantaneous currents on each of the windings. Current sensors 18 can be any known or otherwise conventional devices. In embodiments, current sensors 18 provide information representative of the magnitude or levels of the currents on the windings of motor 12. With the current level information provided by current sensors 18, motor control system 10 can derive information regarding the relative phases of the signals $I_{A-F}$, which will be representative of the phases of the currents in the windings of the motor 12. In other embodiments, the current sensors 18 directly provide information regarding the phases of the motor winding currents. Yet other embodiments of the motor system 8 include sensors or other devices that provide additional or alternative information representative of electrical operating characteristics of the motor 12 (e.g., voltage feedback signals). Embodiments (not shown), may also include other sensors or devices such as an encoder, resolver or other sensor that provides information on the rotational or angular position ($\theta$) of the shaft of motor 12.

In embodiments, motor control system 10 is configured to receive multiphase control input or reference commands specifying a desired output to be produced by motor 12. The reference commands may, for example, be representative of desired torque or speed of the motor 12. Each reference command may correspond to one of the phases or windings of the motor 12. In embodiments such as those described below comprising a six-phase motor 12, control system 10 may receive reference commands $R_A$, $R_B$, $R_C$, $R_D$, $R_E$, $R_F$ (i.e., $R_{A-F}$). In response to the reference commands $R_{A-F}$ and the feedback signals IA-F, motor control system 10 produces voltage drive control signals $V_a$, $V_b$, $V_c$, $V_d$, $V_e$, $V_f$ (i.e., $V_{a-f}$), each of which is associated with one of the windings of the motor 12. Motor control system 10 produces the voltage drive control signals Va-f based on a control algorithm. In embodiments, motor control system 10 implements a flux-weakening (FW) and maximum-torque-per-ampere (MTPA) control algorithms to produce the voltage drive control signals. FW and MTPA algorithms are generally known, and any such conventional or otherwise known algorithm may be used by the control system 10. The voltage drive control signals $V_{a-f}$ are applied to the inverter 14, which produces the voltage drive commands $V_{A-F}$ in response to the voltage drive control signals.

Figure 2:
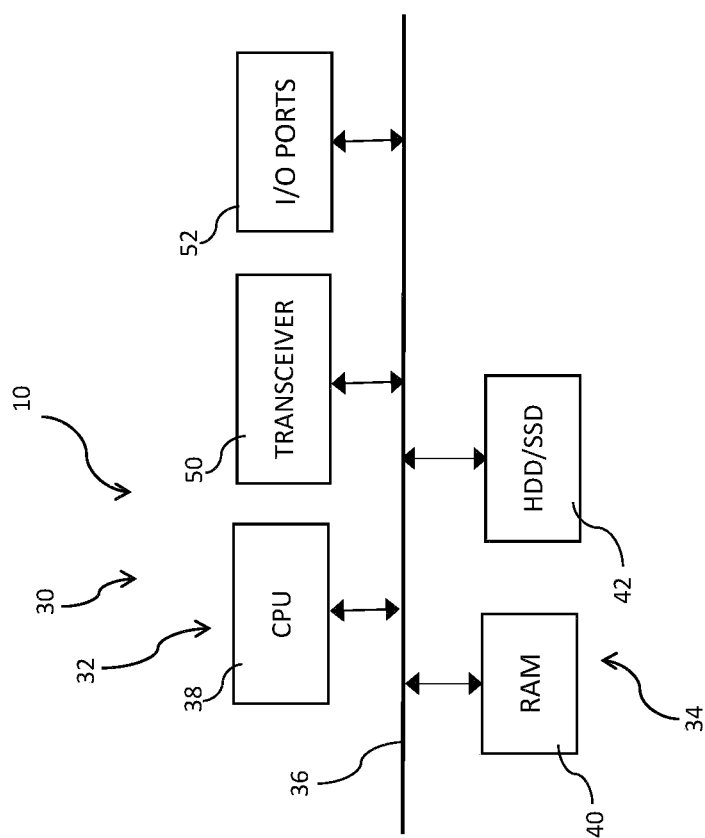
FIG. 2 is a diagrammatic illustration of components of a control system, in accordance with embodiments.

FIG. 2 is diagrammatic illustration of exemplary hardware components of the motor control system 10 in accordance with embodiments. The illustrated embodiments include a processing system 30 comprising processing components 32 and storage components 34 coupled by a bus 36. Processing components 32 may, for example, include one or more central processing units (CPUs) 38 providing the processing functionality of the motor control system 10. The storage components 34 may include RAM memory 40, hard disk drive (HDD) and/or solid state drive (SSD) memory 42, providing the information and other data storage functionality of the motor control system 10. For example, operating system and other software used by the processing components 32 to implement the motor control methods and algorithms described herein may be stored in the storage components 34. Components of the processing system 30 can be implemented as programmed microprocessors, application specific integrated circuits (ASICs), controllers and/or discrete circuit components. Other embodiments of the processing system 30 are implemented using other conventional or otherwise known systems or devices. The embodiments illustrated in FIG. 2 also include input/output (I/O) ports 52 through which the motor control system 10 can receive and transmit information or other data. For example, in embodiments, the current sensors 18 can be coupled to the processing components 32 through the I/O ports 52. Reference commands such as $R_{A-F}$ and the drive control signals such as $V_{a-f}$ may be coupled to and/or from the control system 10 through the I/O ports 52. I/O ports 52 may be coupled to a communications module (not shown) for sending and receiving commands, signals or messages over a network. The communication module may be capable of communications over one or more wireless or wired technologies (e.g., WiFi, Bluetooth, cellular networks, local area networks (LANs) and/or wide area networks (WANs)).

Figure 3:
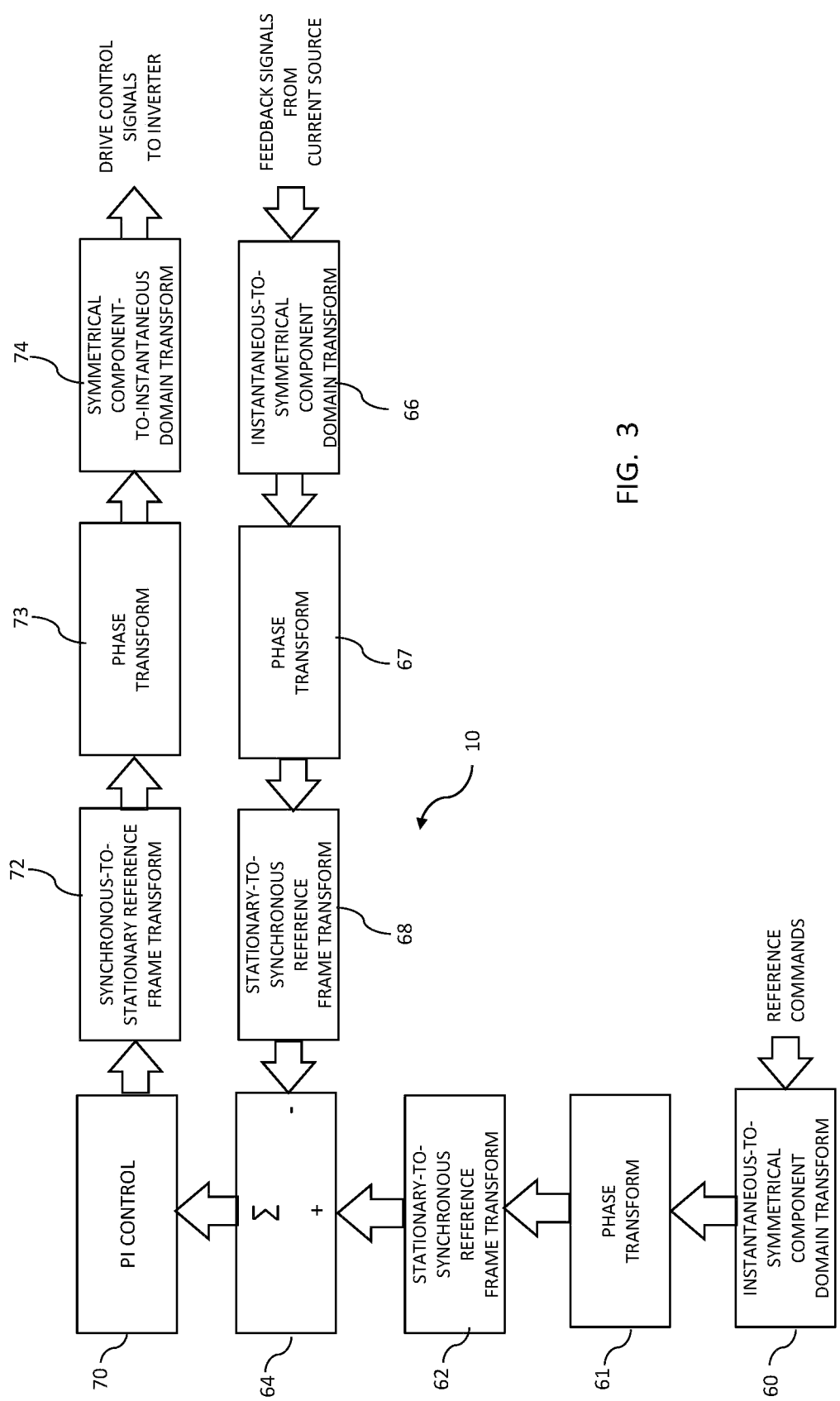
FIG. 3 is a diagrammatic illustration of functional components of a control system, in accordance with embodiments.

FIG. 3 is a functional diagrammatic illustration of a closed loop motor control system 10 for a six-phase motor 12 in accordance with embodiments. As described in greater detail below, the control system 10 implements motor control methods or algorithms that include operation in the symmetrical components domain. Accordingly, the control system 10 includes functionality that converts commands and signals between their then-current or instantaneous time domain values and their associated or corresponding symmetrical components domain values. In connection with a six-phase system 10, for example, the symmetrical transformations create six balanced six-phase systems referenced to a reference phasor. A system of this type may be characterized as having ninety-degree phase shifts between each of phases A and D, phases B and E, and phases C and F. Embodiments may be defined by the following convention, where each symmetrical component includes a magnitude and an angle.

In a positive lead sequence, Plead, all phasors share the same magnitude, and the phase rotation is ABC, with these phasors separated by one-hundred and twenty degrees. The angle of the sequence is equivalent to the angle of the A phasor relative to the reference phasor. The DEF phasors are ninety degrees phase shifted from their ABC pair.

In a negative lead sequence, Nlead, all phasors share the same magnitude, and the phase rotation is ACB, with these phasors separated by one-hundred and twenty degrees. The angle of the sequence is equivalent to the angle of the A phasor relative to the reference phasor. The DFE phasors are ninety degrees phase shifted from their ACB pair.

In a positive lag sequence, Plag, all phasors share the same magnitude, and the phase rotation is DEF, with these phasors separated by one-hundred and twenty degrees. The angle of the sequence is equivalent to the angle of the D phasor relative to the reference phasor. The ABC phasors are ninety degrees phase shifted from their DEF pair.

In a negative lag sequence, Nlag, all phasors share the same magnitude, and the phase rotation is DFE, with these phasors separated by one-hundred and twenty degrees. The angle of the sequence is equivalent to the angle of the D phasor relative to the reference phasor. The ACB phasors are ninety degrees phase shifted from their DFE pair.

In a zero lead sequence, Zlead, all phasors share the same magnitude, ABC share the same angle relative to the reference phasor, and DEF are ninety degrees phase shifted from ABC.

In the zero lag sequence, Zlag, DEF share the same angle, and ABC share the same angle, which is ninety degrees phase shifted from DEF. The phasors all share the same magnitude.

As shown in FIG. 3 by step 60, the reference commands $R_{A-F}$ are converted or transformed from their initial state values to their corresponding or associated three-phase, stationary reference frame symmetrical components domain values RPlead, RPlag, RNlead, RNlag, RZlead, RZlag. Conventional or otherwise known computational algorithms and approaches can be used by control system 10 to perform the symmetrical components transformation at step 60. For example, in a six or twelve phase ninety-degree system, the instantaneous values of ABC and corresponding DEF form the real and imaginary components of three complex vectors, and a classical symmetrical transform may be performed on them directly. Position information such as that provided by a resolver may be used in connection with a three phase system to determine the angle and instantaneous power of vectors. In embodiments, for example, control system 10 may convert the individual initial state values of the reference commands to vector values, and then perform the symmetrical components transform on the vector values.

As shown by step 61, the reference symmetrical components domain values RPlead, RPlag, RNlead, RNlag, RZlead, RZlag are phase transformed from an initial three-phase, stationary reference frame to two-phase, stationary reference frame (e.g., alpha-beta) values. In embodiments, control system 10 performs conventional or otherwise known computational algorithms and approaches, such as alpha-beta (i.e., $\alpha\beta\gamma$ transforms) or Clarke transforms, at step 61.

As shown by step 62, the reference command symmetrical components domain values RPlead, RPlag, RNlead, RNlag, RZlead, RZlag are transformed from the stationary reference frame to a synchronous reference frame for further processing. In embodiments, control system 10 performs conventional or otherwise known computational algorithms and approaches, such as direct-quadrature-zero (i.e., dq0 transforms) to convert the reference command symmetrical components to corresponding or associated reference command synchronous frame values RPd (positive d), RPq (positive q), RNd (negative d), RNq (negative q), RZd (zero d), RZq (zero q). In embodiments, for example, control system 10 may convert vector values of the reference command symmetrical components to the dq reference frame, and then convert the vector values of the reference command symmetrical components to the individual synchronous frame reference command symmetrical values. The synchronous frame reference command symmetrical components RPd, RPq, RNd, RNq, RZd, RZq are processed by summing step 64 as described below.

As shown by step 66, the feedback signals $I_{A-F}$ are converted or transformed from their instantaneous state values to their corresponding or associated three-phase stationary reference frame symmetrical components domain values IPlead, IPlag, INlead INlag IZlead, IZlag. Conventional or otherwise known computational algorithms and approaches, including those described above, can be used by control system 10 to perform the symmetrical components transformation at step 66. In embodiments, for example, control system 10 may convert the instantaneous state values of the feedback signals to vector values, and then perform the symmetrical components transform on the vector values.

As shown by step 67, the feedback symmetrical components domain values IPlead, IPlag, INlead, INlag, IZlead, IZlag are phase transformed from an initial three-phase, stationary reference frame to two-phase, stationary reference frame (e.g., alpha-beta) values. In embodiments, control system 10 performs conventional or otherwise known computational algorithms and approaches, such as alpha-beta or Clarke transforms, at step 67.

As shown by step 68, the feedback symmetrical components domain values IPlead, IPlag, INlead, INlag, IZlead, IZlag are transformed from the stationary reference frame to the synchronous reference frame for further processing. In embodiments, control system 10 performs conventional or otherwise known computational algorithms and approaches, such as dq0 transforms, to convert the feedback information symmetrical components to corresponding or associated synchronous frame values IPd (positive d), IPq (positive q), INd (negative d), INq (negative q), IZd (zero d), IZq (zero q). In embodiments, for example, control system 10 may convert vector values of the feedback information symmetrical components to the dq reference frame, and then convert the vector values of the feedback information symmetrical components to the individual synchronous frame feedback information symmetrical values. In embodiments, an angle value, such as for example that provided by a resolver, may be used in connection with the conversion of the vector values of the feedback information symmetrical components to the associated synchronous reference frame values. The synchronous frame feedback symmetrical components IPd, IPq, INd, INq, IZd, IZq are processed by summing step 64.

At step 64 the control system 10 performs a logical function such as a summing operation to combine the synchronous frame reference command symmetrical components RPd, RPq, RNd, RNq, RZd, RZq and the synchronous frame feedback information symmetrical components IPd, IPq, INd, INq, IZd, IZq. The control system 10 thereby generates synchronous frame control symmetrical components CPd, CPq, CNd, CNq, CZd, CZq. In embodiments, at step 64 the control system 10 subtracts the feedback information symmetrical components from the reference command symmetrical components to produce the synchronous frame control symmetrical components in a form that will compensate for electrical and/or other imbalances in the motor 12 and/or other components of system 8. By this action, in embodiments the negative and zero synchronous frame control symmetrical components CNd, CNq, CZd, CZq, which represent complex outputs, may be forced to zero, while the positive synchronous frame drive command symmetrical components CPd, CPq, which represent a real output, may have a non-zero value. An objective is to create an imbalance that will interact with system imbalances to achieve a desired state. In embodiments, the desired state may be no resulting imbalances. In other embodiments an objective may be to provide certain imbalances.

At step 70 the control system 10 performs proportional-integral (PI) control based the synchronous frame control symmetrical components CPd, CPq, CNd, CNq, CZd, CZq. As described above, conventional or otherwise known control algorithms such as FW and MTPA algorithms can be performed at step 70. By these actions the control system 10 operates in the symmetrical components domain to generate synchronous frame drive command symmetrical components DPd, DPq, DNd, DNq, DZd, DZq representative of the desired voltage drive control signals $V_{a-f}$.

At steps 72, 73 and 74 the control system 10 coverts the synchronous frame drive command symmetrical components DPd, DPq, DNd, DNq, DZd, DZq to the corresponding instantaneous drive control signals $V_{a-f}$. In the illustrated embodiments, for example, at step 72 the control system 10 converts or transforms the synchronous frame drive command symmetrical components DPd, DPq, DNd, DNq, DZd, DZq to their corresponding two-phase stationary reference frame drive command symmetrical components values DPlead, DPlag, DNlead, DNlag, DZlead, DZlag. Conventional or otherwise known computational approaches or algorithms, including those such as dq0 transforms described above, can be used by control system 10 in connection with step 72. In embodiments, for example, control system 10 may convert the synchronous frame drive command symmetrical components to vector values, and then perform the symmetrical components transform on the vector values. An angle value can be used in connection with the conversion of the vector values of the drive command symmetrical components to the associated stationary reference frame values.

As shown by step 73, the stationary reference frame drive command symmetrical components domain values DPlead, DPlag, DNlead, DNlag, DZlead, DZlag are phase transformed from the two-phase, stationary reference frame (e.g., alpha-beta) values to corresponding three-phase, stationary reference frame values. In embodiments, control system 10 performs conventional or otherwise known computational algorithms and approaches, such as alpha-beta or Clarke transforms, at step 73.

At step 74, the three-phase stationary frame drive command symmetrical components are converted or transformed to the corresponding or associated instantaneous drive control signals $V_{a-f}$. Conventional or otherwise known computational approaches or algorithms, including those described above, can be used by control system 10 in connection with step 74. In embodiments, for example, control system 10 may convert vector values of the stationary frame drive command symmetrical sequences to unbalanced phasors, and then convert the vector values of the unbalanced phasors to the individual instantaneous drive control signals.

Figure 4:
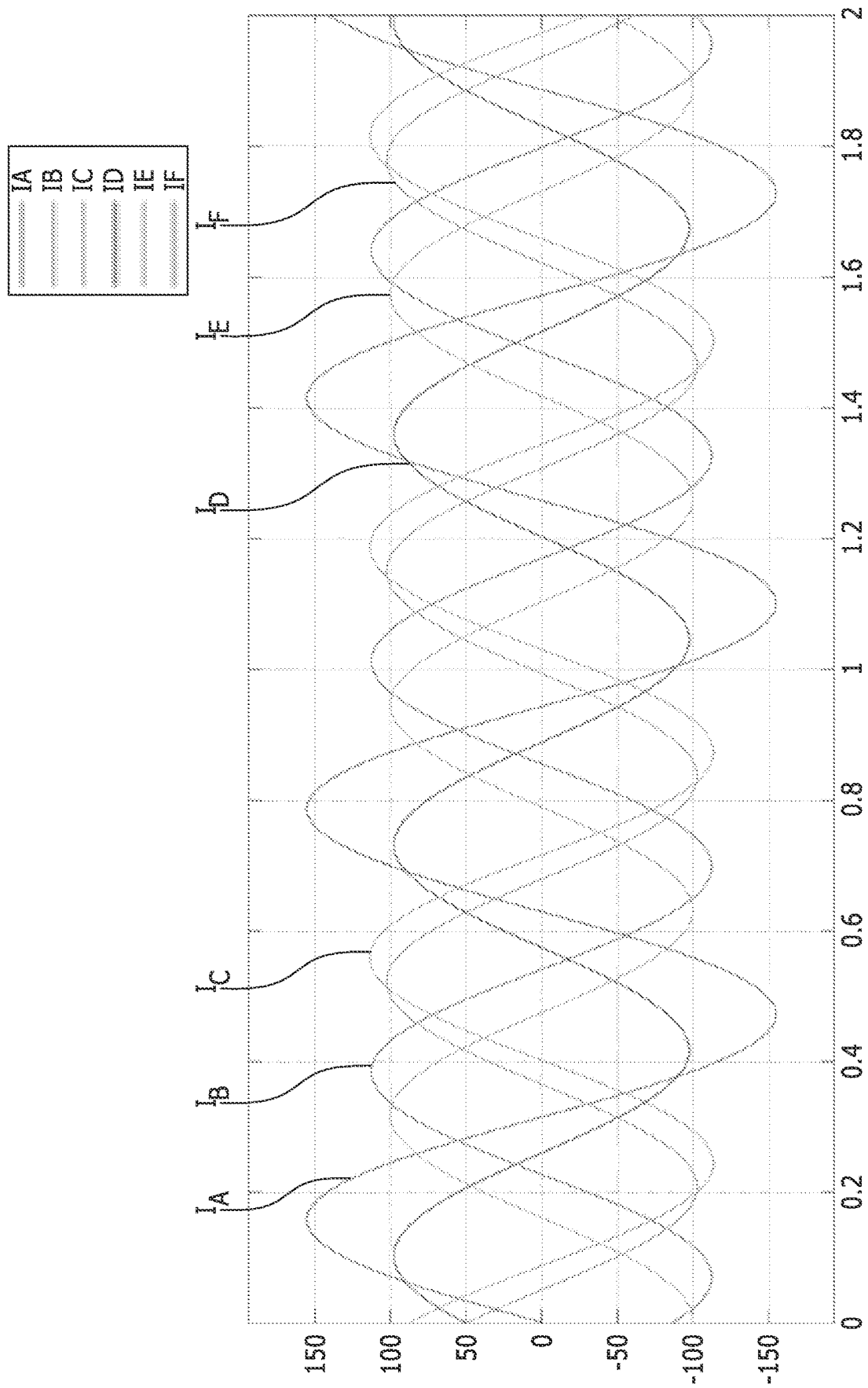
FIG. 4 is a graph of feedback signals produced by an exemplary motor system operating in an unbalanced, open loop form, in accordance with embodiments.

Embodiments of the motor systems 8 configured with control systems 10 of the types described herein have demonstrated enhanced balanced, closed loop operation in environments that would otherwise have exhibited unbalances. FIG. 4 is a graph of feedback signals $I_{A-F}$ produced by an exemplary motor system 8 operating in open loop form and representative of the phases A-F, respectively. The unbalanced nature of the motor system 8 is evidenced by the unsymmetrical nature of the amplitudes and phases of the feedback signals. Measured control parameters of the system 8 in the open loop, unbalanced form corresponding to FIG. 4 are shown in FIGS. 5A-5F. FIG. 5A is a graph of the positive d feedback information symmetrical component IPd; FIG. 5B is a graph of the positive q feedback information symmetrical component IPq; FIG. 5C is a graph of the negative d feedback information symmetrical component INd; FIG. 5D is a graph of the negative q feedback information symmetrical component INq; FIG. 5E is a graph of the zero d feedback information symmetrical component IZd; and FIG. 5F is a graph of the negative q feedback information symmetrical component IZq.

Figure 6:
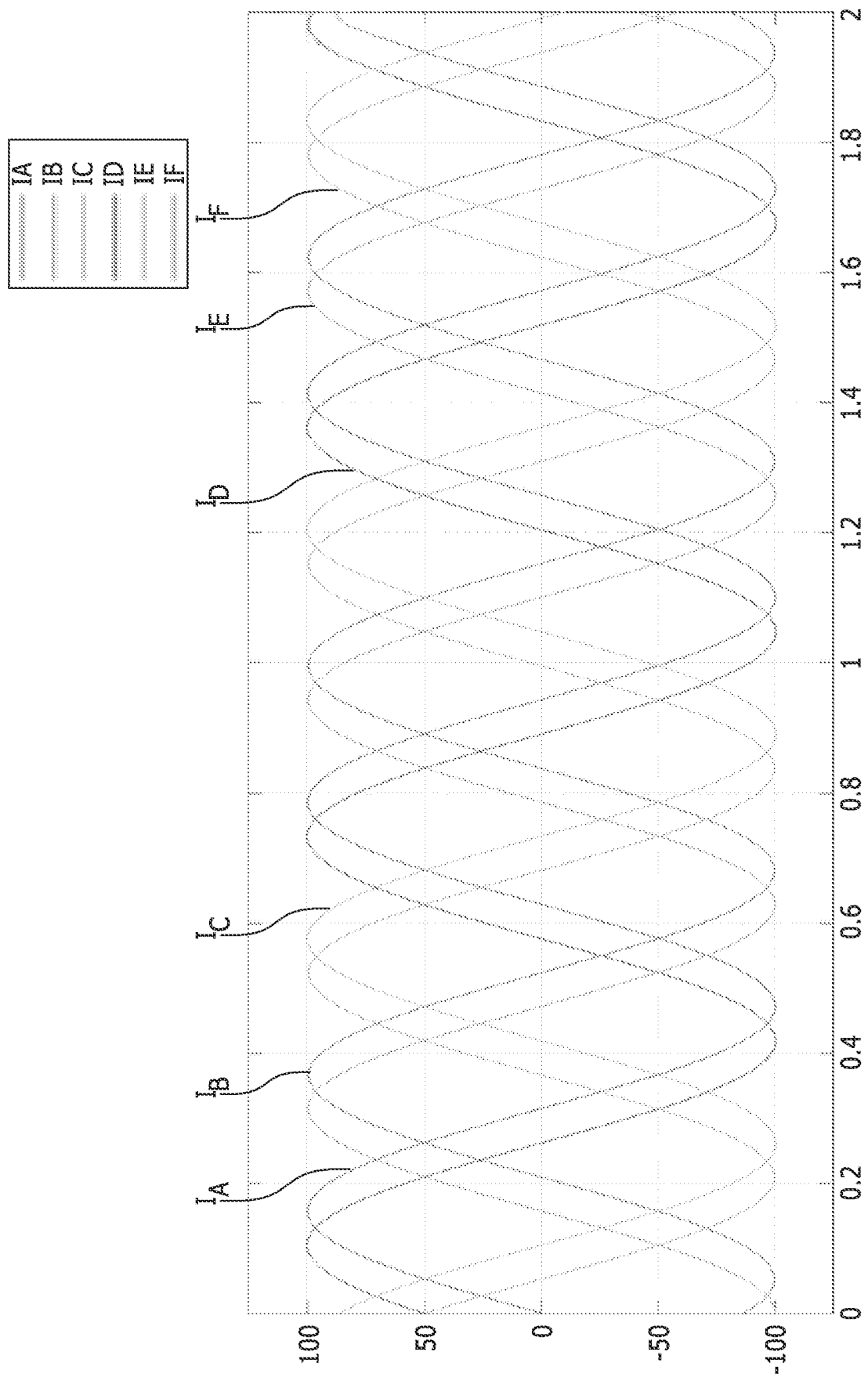
FIG. 6 is a graph of feedback signals produced by an exemplary motor system operating in a balanced, closed loop form, in accordance with embodiments.

FIG. 6 is a graph of feedback signals $I_{A-F}$ produced by an exemplary motor system 8 operating in closed loop form with the symmetrical components domain control methodology described herein, and representative of the phases A-F, respectively. The balanced nature of the motor system 8, and the use of the control algorithms disclosed herein, are evidenced by the symmetrical nature of the amplitudes and phases of the feedback signals. Measured control parameters of the system 8 in the closed loop, balanced form corresponding to FIG. 6 are shown in FIGS. 7A-7F. FIG. 7A is a graph of the positive d feedback information symmetrical component IPd; FIG. 7B is a graph of the positive q feedback information symmetrical component IPq; FIG. 7C is a graph of the negative d feedback information symmetrical component INd; FIG. 7D is a graph of the negative q feedback information symmetrical component INq; FIG. 7E is a graph of the zero d feedback information symmetrical component IZd; and FIG. 7F is a graph of the negative q feedback information symmetrical component IZq.

Figure 8:
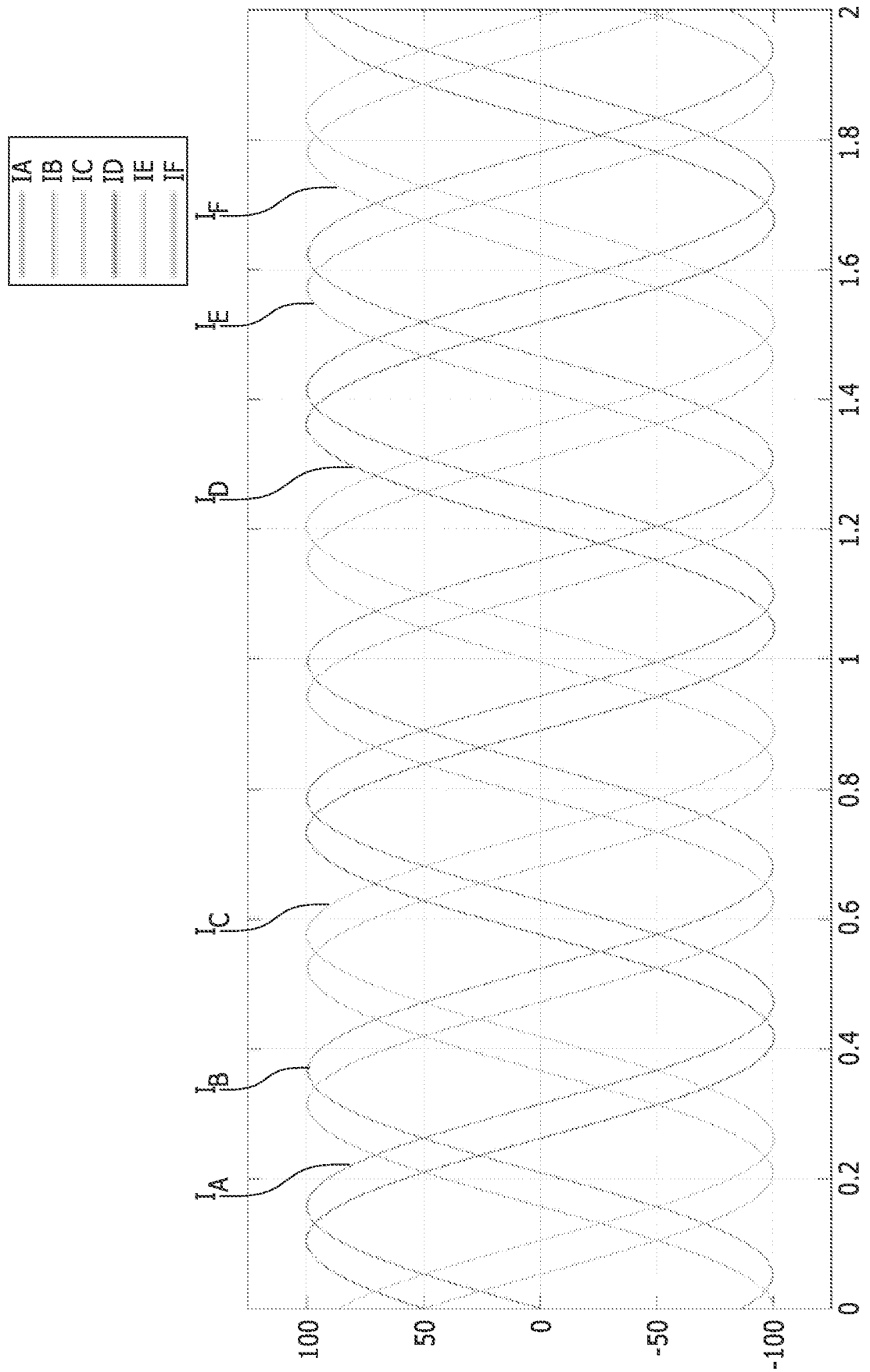
FIG. 8 is a graph of feedback signals produced by an exemplary motor system operating in a balanced, open loop form, in accordance with embodiments.

FIG. 8 illustrates, for purposes of reference and example, a graph of feedback signals $I_{A-F}$ representative of the winding phases A-F, respectively, produced by an exemplary motor system 8 operating in open loop form without the symmetrical components domain control methodology described herein, but when the system is balanced. The balanced nature of the motor system 8 is evidenced by the symmetrical nature of the amplitudes and phases of the feedback signals. Measured control parameters of the system 8 in the open loop, balanced form corresponding to FIG. 8 are shown in FIGS. 9A-9F. FIG. 9A is a graph of the positive d feedback information symmetrical component IPd; FIG. 9B is a graph of the positive q feedback information symmetrical component IPq; FIG. 9C is a graph of the negative d feedback information symmetrical component INd; FIG. 9D is a graph of the negative q feedback information symmetrical component INq; FIG. 9E is a graph of the zero d feedback information symmetrical component IZd; and FIG. 9F is a graph of the negative q feedback information symmetrical component IZq.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The compensation approaches described herein can be incorporated into motors having fewer or greater numbers of phases. The scope of the invention should, therefore, be determined with reference to the appended claims, along with the full scope of equivalents to which such claims are entitled.

The invention claimed is:

1. A method for operating one or more processors of a multiphase motor control system, comprising:
   receiving multiphase reference commands;
   transforming the multiphase reference commands into corresponding reference symmetrical components;
   receiving feedback information representative of multiphase drive signals in a motor;
   transforming the feedback information into corresponding feedback symmetrical components;
   generating multiphase motor control symmetrical components based on the reference symmetrical components and the feedback symmetrical components; and
   transforming the multiphase motor control symmetrical components into corresponding multiphase motor drive control signals.

2. The method of claim 1 wherein:
   transforming the multiphase reference commands comprises:
      transforming the reference commands into reference symmetrical components in a stationary reference frame; and
      transforming the stationary reference frame reference symmetrical components into a synchronous reference frame;
   transforming the feedback information comprises:
      transforming the feedback information into feedback symmetrical components in the stationary reference frame; and
      transforming the stationary reference frame feedback symmetrical components into the synchronous reference frame;
   generating the multiphase motor control symmetrical components includes generating the multiphase motor control symmetrical components in the synchronous reference frame based on the reference symmetrical components in the synchronous reference frame and the feedback symmetrical components in the synchronous reference frame; and
   transforming the multiphase motor control symmetrical components comprises:
      transforming the synchronous reference frame motor control symmetrical components into the stationary reference frame; and
      transforming the stationary reference frame motor control symmetrical components into the multiphase motor drive control signals.

3. The method of claim 2 wherein transforming the reference symmetrical components and the feedback symmetrical components from the stationary reference frame into the synchronous reference frame, and transforming the multiphase motor control symmetrical components from the synchronous reference frame into the stationary reference frame, comprises direct-quadrature-zero transformations.

4. The method of claim 3 and further including phase transforming (e.g., alpha-beta transforming) the stationary reference frame reference symmetrical components, the stationary reference frame feedback symmetrical components, and the synchronous reference frame motor control symmetrical components.

5. The method of claim 2 and further including phase transforming (e.g., alpha-beta transforming) the stationary reference frame reference symmetrical components, the stationary reference frame feedback symmetrical components, and the synchronous reference frame motor control symmetrical components.

6. The method of claim 1 wherein generating multiphase motor control symmetrical components comprises summing the synchronous reference frame reference symmetrical components and the synchronous reference frame feedback symmetrical components.

7. The method of claim 6 wherein summing the synchronous reference frame reference symmetrical components and the synchronous reference frame feedback symmetrical components comprises subtracting the synchronous reference frame feedback symmetrical components from the reference symmetrical components.

8. The method of claim 1 wherein generating the multiphase motor control symmetrical components further comprises PID (proportional, integral, differential) processing the synchronous reference frame multiphase motor control symmetrical components by a motor control algorithm.

9. The method of claim 1 for a six-phase motor.

10. A motor control system including one or more processors configured to:
receive multiphase reference commands;
transform the multiphase reference commands into corresponding reference symmetrical components;
receive feedback information representative of multiphase drive signals in a motor;
transform the feedback information into corresponding feedback symmetrical components;
generate multiphase motor control symmetrical components based on the reference symmetrical components and the feedback symmetrical components; and
transform the multiphase motor control symmetrical components into corresponding multiphase motor drive control signals.

11. The motor control system of claim 10 wherein the one or more processors are configured to:
transform the multiphase reference commands by steps comprising:
transforming the reference commands into reference symmetrical components in a stationary reference frame; and
transforming the stationary reference frame reference symmetrical components into a synchronous reference frame;
transform the feedback information by steps comprising:
transforming the feedback information into feedback symmetrical components in the stationary reference frame; and
transforming the stationary reference frame feedback symmetrical components into the synchronous reference frame;
generate the multiphase motor control symmetrical components by steps comprising generating the multiphase motor control symmetrical components in the synchronous reference frame based on the reference symmetrical components in the synchronous reference frame and the feedback symmetrical components in the synchronous reference frame; and
transform the multiphase motor control symmetrical components by steps comprising:
transforming the synchronous reference frame motor control symmetrical components into the stationary reference frame; and
transforming the stationary reference frame motor control symmetrical components into the multiphase motor drive control signals.

12. The motor control system of claim 11 wherein the one or more processors are configured to transform the reference symmetrical components and the feedback symmetrical components from the stationary reference frame into the synchronous reference frame, and transform the multiphase motor control symmetrical components from the synchronous reference frame into the stationary reference frame, by steps comprising direct-quadrature-zero transformations.

13. The motor control system of claim 10 and further comprising a motor and an inverter coupled to the motor control system.

14. A tangible, non-transitory computer-readable medium programmed with instructions to operate a multiphase motor that, when executed by one or more processors of a computer system, cause the computer system to:
receive multiphase reference commands;
transform the multiphase reference commands into corresponding reference symmetrical components;
receive feedback information representative of multiphase drive signals in a motor;
transform the feedback information into corresponding feedback symmetrical components;
generate multiphase motor control symmetrical components based on the reference symmetrical components and the feedback symmetrical components; and
transform the multiphase motor control symmetrical components into corresponding multiphase motor drive control signals.

15. The tangible, non-transitory computer-readable medium of claim 14, wherein the instructions cause the computer system to:
transform the multiphase reference commands by steps comprising:
transforming the reference commands into reference symmetrical components in a stationary reference frame; and
transforming the stationary reference frame reference symmetrical components into a synchronous reference frame;
transform the feedback information by steps comprising:
transforming the feedback information into feedback symmetrical components in the stationary reference frame; and
transforming the stationary reference frame feedback symmetrical components into the synchronous reference frame;
generate the multiphase motor control symmetrical components by steps comprising generating the multiphase motor control symmetrical components in the synchronous reference frame based on the reference symmetrical components in the synchronous reference frame and the feedback symmetrical components in the synchronous reference frame; and
transform the multiphase motor control symmetrical components by steps comprising:
transforming the synchronous reference frame motor control symmetrical components into the stationary reference frame; and
transforming the stationary reference frame motor control symmetrical components into the multiphase motor drive control signals.

16. The tangible, non-transitory computer-readable medium of claim 15, wherein the instructions cause the computer system to transform the reference symmetrical components and the feedback symmetrical components from the stationary reference frame into the synchronous reference frame, and transform the multiphase motor control symmetrical components from the synchronous reference frame into the stationary reference frame, by steps comprising direct-quadrature-zero transformations.

17. The tangible, non-transitory computer-readable medium of claim 16, wherein the instructions cause the computer system to phase transform (e.g., alpha-beta transform) the stationary reference frame reference symmetrical components, the stationary reference frame feedback symmetrical components, and the synchronous reference frame motor control symmetrical components.

* * * * *